United States Patent
Chen

(10) Patent No.: US 10,412,926 B2
(45) Date of Patent: Sep. 17, 2019

(54) PET HOUSE

(71) Applicant: Li-Chen Chen, Tainan (TW)

(72) Inventor: Li-Chen Chen, Tainan (TW)

(*) Notice: Subject to any disclaimer, the term of this patent is extended or adjusted under 35 U.S.C. 154(b) by 254 days.

(21) Appl. No.: 15/694,825

(22) Filed: Sep. 3, 2017

(65) Prior Publication Data

US 2018/0368354 A1    Dec. 27, 2018

(30) Foreign Application Priority Data

Jun. 23, 2017   (TW) .............................. 106209184 A

(51) Int. Cl.
*A01K 1/03*      (2006.01)
*A01K 1/015*     (2006.01)
*A01K 15/02*     (2006.01)

(52) U.S. Cl.
CPC ............ *A01K 1/0157* (2013.01); *A01K 1/033* (2013.01); *A01K 15/024* (2013.01)

(58) Field of Classification Search
CPC ........ A01K 1/03; A01K 1/0157; A01K 1/033; A01K 1/0107; A01K 63/003; A01K 15/02; A01K 1/0125; A01K 1/0245; A01K 1/032; A01K 1/034; A01K 1/035; A01K 31/04; A01K 31/06; A01K 31/08
USPC ................. 119/498, 452, 482, 472, 706, 165
See application file for complete search history.

(56) References Cited

U.S. PATENT DOCUMENTS

| 4,029,048 A * | 6/1977 | Gershbein ............ A01K 1/0107 119/165 |
| 4,940,016 A * | 7/1990 | Heath .................. A01K 1/0125 119/168 |
| 5,577,464 A * | 11/1996 | Wellington .............. A01K 1/03 119/452 |
| 5,769,026 A * | 6/1998 | Kohn .................... A01K 1/0107 119/165 |
| 5,887,546 A * | 3/1999 | Gruel ................... A01K 1/0107 119/165 |
| 6,044,799 A * | 4/2000 | Tominaga ................. A01K 1/03 119/452 |
| 6,062,171 A * | 5/2000 | Tominaga ................. A01K 1/03 119/455 |
| 6,067,939 A * | 5/2000 | Tominaga ................. A01K 1/03 119/474 |

(Continued)

*Primary Examiner* — Yvonne R Abbott-Lewis
(74) *Attorney, Agent, or Firm* — Li & Cai Intellectual Property (USA) Office

(57) ABSTRACT

A pet house includes a housing structure, an engaging member, and an auxiliary carrier. The housing structure includes a bottom plate, four surrounding side plates, and a top portion. The inside of the housing structure is formed with an accommodating space which can communicate with the outside of the housing structure through an opening. One of the surrounding side plates and the top portion includes an engaging structure which is detachably engaged with the engaging member, and the engaging member can be engaged with the engaging structure of another pet house. The auxiliary carrier is disposed in the accommodating space. The auxiliary carrier can be placed on the bottom plate when the auxiliary carrier is disposed in the accommodating space. The auxiliary carrier can be disposed in the accommodating space when two of the bottom plate, the surrounding side plates, and the top portion are separated from each other.

10 Claims, 17 Drawing Sheets

(56) References Cited

U.S. PATENT DOCUMENTS

| | | | | |
|---|---|---|---|---|
| 6,832,580 B2* | 12/2004 | Marchioro | ........... | A01K 1/0245 |
| | | | | 119/452 |
| 6,886,495 B1* | 5/2005 | Madden | ................. | A01K 1/033 |
| | | | | 119/482 |
| 7,584,720 B1* | 9/2009 | Jackson | ................. | A01K 1/033 |
| | | | | 119/452 |
| 8,342,131 B2* | 1/2013 | McPherson | .......... | A01K 1/0107 |
| | | | | 119/436 |
| 9,585,363 B2* | 3/2017 | Casto | ....................... | A01K 1/03 |
| 9,992,980 B2* | 6/2018 | Tominaga | ............ | A01K 63/003 |
| 2015/0164040 A1* | 6/2015 | Anderson | ............ | A01K 1/0125 |
| | | | | 119/168 |
| 2016/0302379 A1* | 10/2016 | Sprague | ............... | A01K 1/0107 |
| 2016/0338316 A1* | 11/2016 | Niedwick | ............... | A01K 1/033 |
| 2018/0368367 A1* | 12/2018 | Chen | ................... | A01K 1/0157 |

* cited by examiner

PET HOUSE

BACKGROUND OF THE INVENTION

1. Field of the Invention

The present disclosure relates to a pet house; in particularly to, a modular pet house.

2. Description of Related Art

In recent years, there has been increasing interest in keeping pets at home, such as cats or dogs, towards most people. To provide a comfortable living environment, people like to arrange for the pets to rest or live in pet houses at home. Conventional pet houses cannot be connected to each other so that the conventional pet houses are inconvenient for people who keep multiple pets at home.

In this regards, the present disclosure provides a pet house to overcome the aforementioned drawbacks.

SUMMARY OF THE INVENTION

The main object of the present disclosure is to solve the drawbacks concerning that the conventional pet houses cannot be connected to each other, thus causing inconvenience to people who keep multiple pets at home.

To resolve the above technical problems, the present disclosure provides a pet house including a housing structure, an engaging member, and an auxiliary carrier. The housing structure includes a bottom plate, four surrounding side plates, and a top portion. The peripheral edges of the bottom plate are connected to the surrounding side plates. The top portion is connected to the surrounding side plates. The inside of the housing structure is formed with an accommodating space. At least one of the surrounding side plates has an opening. The opening communicates the accommodating space with the outside of the housing structure. At least two of the bottom plate, the surrounding side plates, and the top portion are detachably connected to each other. At least one of the surrounding side plates and the top portion includes at least one engaging structure. An engaging member is detachably engaged with the engaging structure, in which when the engaging member is engaged with the engaging structure, a portion of the engaging member is exposed to the outside of the housing structure, and the engaging member is capable of being engaged with the engaging structure of another pet house. An auxiliary carrier is disposed in the accommodating space, in which the area of the bottom plate is not less than the area of the bottom of the auxiliary carrier, and the auxiliary carrier is capable of being correspondingly placed on the bottom plate when the auxiliary carrier is disposed in the accommodating space. Moreover, the auxiliary carrier is capable of being correspondingly disposed in the accommodating space when at least two of the bottom plate, the surrounding side plates, and the top portion are separated from each other.

The advantage of the present disclosure is that a user can connect two pet houses to each other through the engaging member so that the pet houses can be assembled in various ways. In addition, the user can place pet diapers, cat scratch boards, or the like, into the auxiliary carrier so that the user can easily replace the pet diapers, the cat scratch boards, or the like, through the characteristic that the auxiliary carrier can be selectively separated from the pet house.

For further understanding of the present disclosure, the following embodiments are provided along with illustrations to facilitate the disclosure of the present disclosure.

DETAILED DESCRIPTION OF PREFERRED EMBODIMENTS

Figure 1:
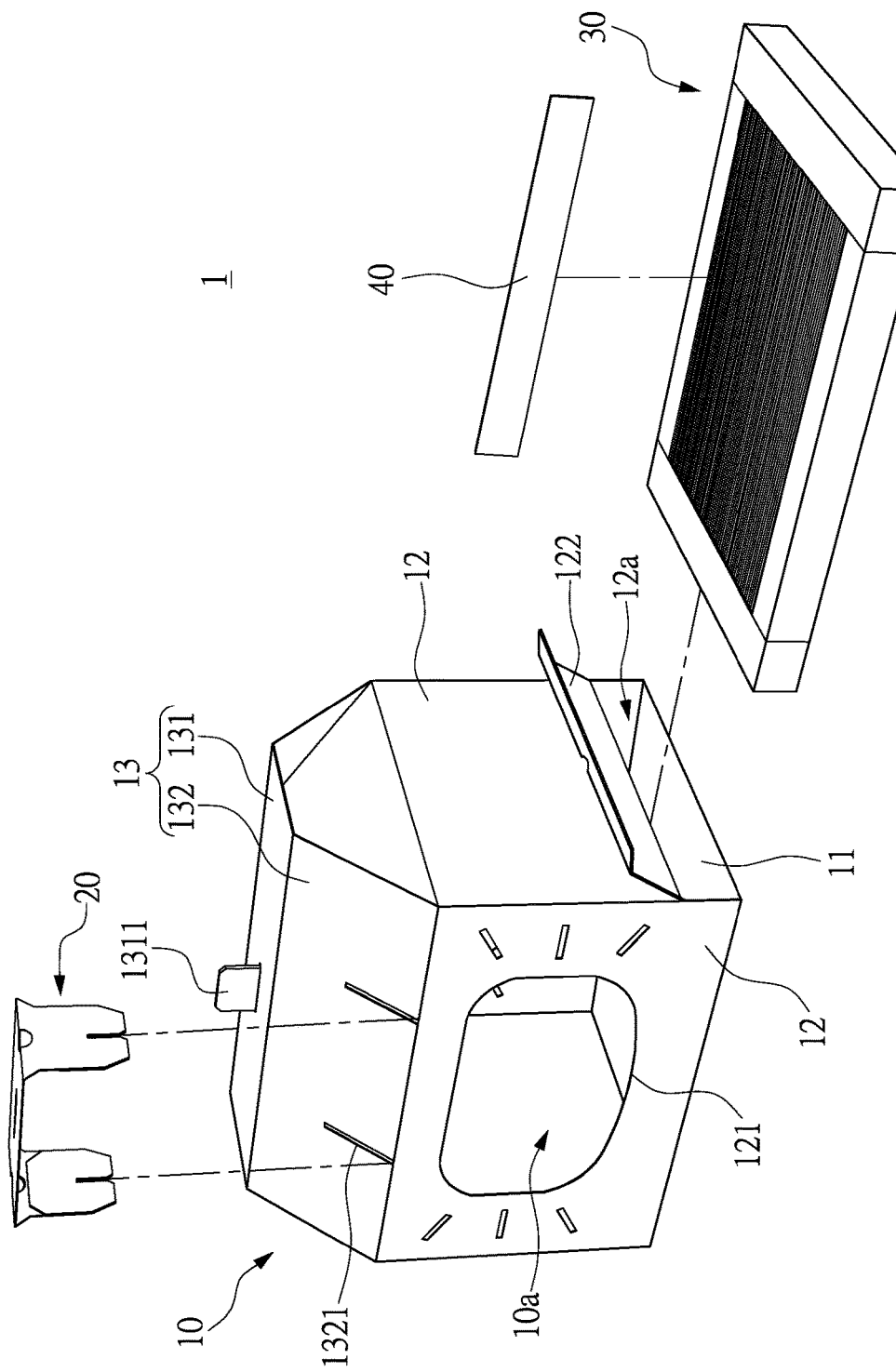
FIG. 1 and FIG. 2 are partial exploded views showing a pet house according to an embodiment of the present disclosure.
Figure 2:
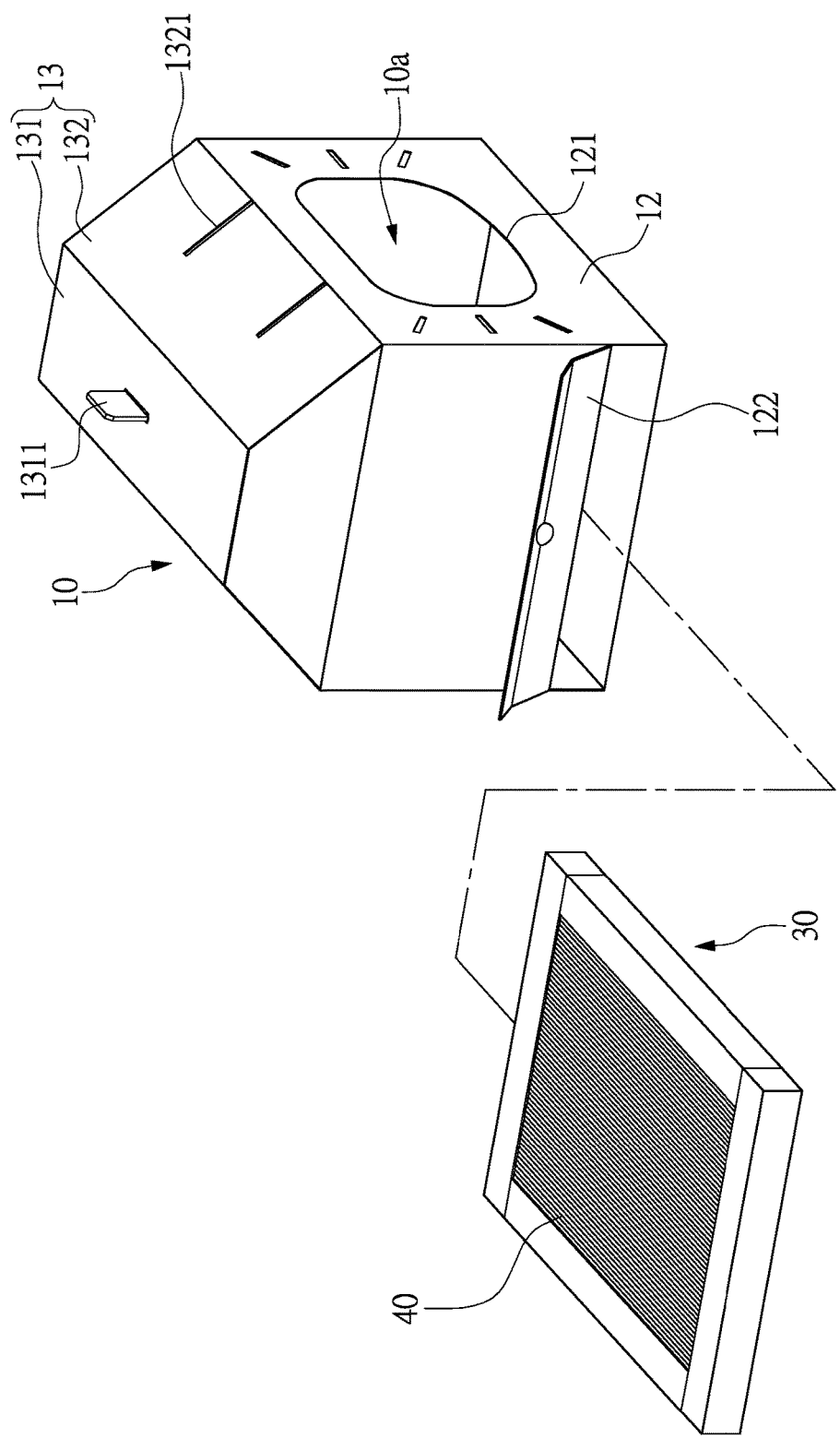

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

Reference is made to FIGS. 1 to 3B which are partial exploded views of a pet house of the present disclosure. The pet house 1 includes a housing structure 10, an engaging member 20, and an auxiliary carrier 30. The inside of the housing structure 10 is formed with an accommodating space 10a, and the auxiliary carrier 30 is selectively disposed in the accommodating space 10a.

The housing structure 10 includes a bottom plate 11, four surrounding side plates 12, and a top portion 13. The peripheral edges of the bottom plate 11 are connected to the surrounding side plates 12, and the top portion 13 is connected to the surrounding side plates 12. Two of the surrounding side plates 12 each have an opening 121, and the two openings 121 are capable of communicating the accommodating space 10a with the outside of the housing structure 10. In practical applications, the shapes and the positions of the openings 121 may be varied according to practical needs, and are not limited to those shown in the Figs. Two side plates 132 of the top portion 13 each have two engaging structures 1321. In practical applications, the number of the engaging structures 1321 formed on each side plate 132 may be increased or decreased according to practical needs, and is not limited to those shown in the Figs. In addition, the present embodiment is explained by the fact that the two side plates 132 each have the engaging structures 1321, but the present invention is not limited thereto. The engaging structures 1321 may be formed on one side plate 132 or may be formed on more side plates 132. In various embodiments, the engaging structures 1321 may also be formed on the surrounding side plate 12, and are not limited to be formed on the top portion 13. In practical applications, the area of the bottom plate 11 is not less than the area of the bottom of the auxiliary carrier 30 to allow the auxiliary carrier 30 to be disposed in the accommodating space 10a.

Figure 3A:
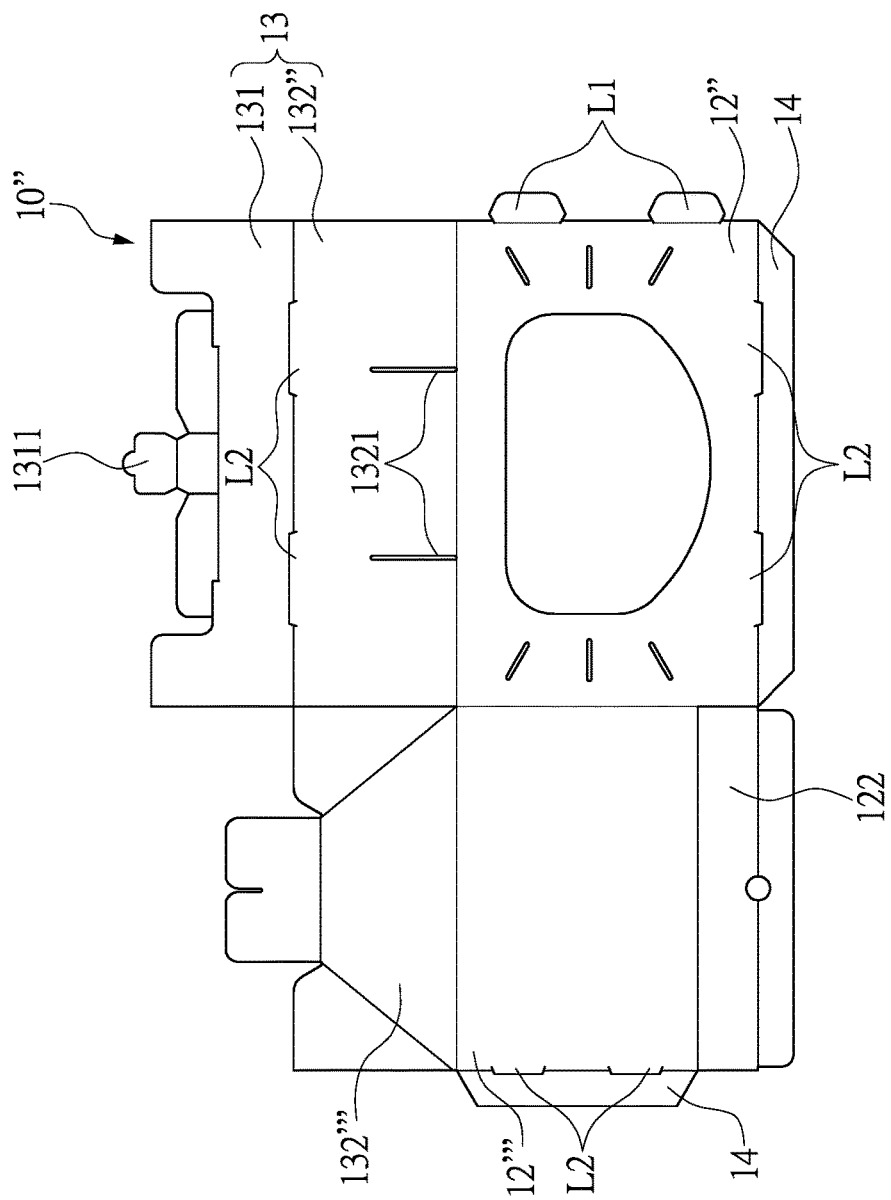
FIG. 3A and FIG. 3B are schematic views showing flattened states of a housing structure of the pet house according to the embodiment of the present disclosure.
Figure 3B:
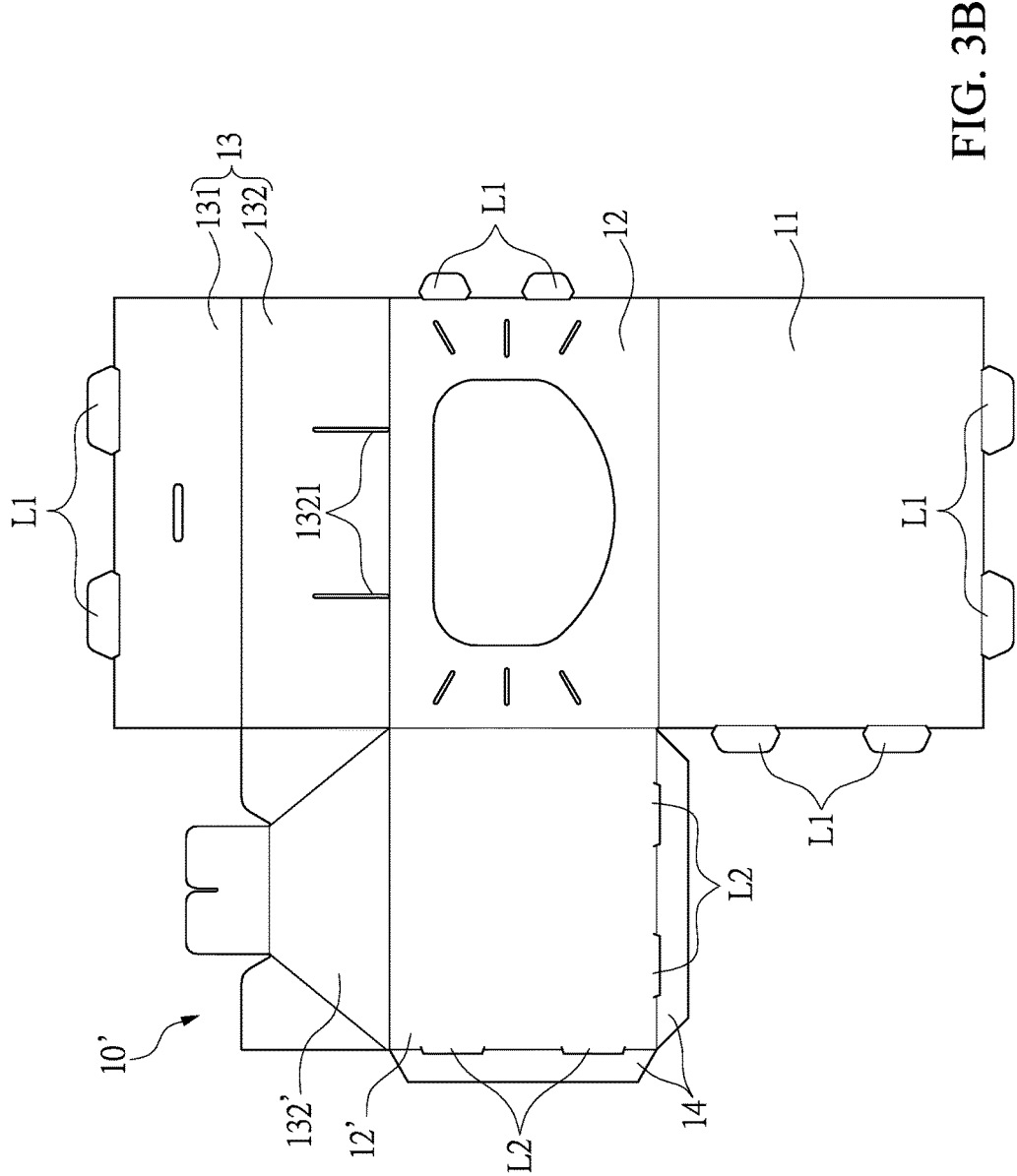
Figure 4:
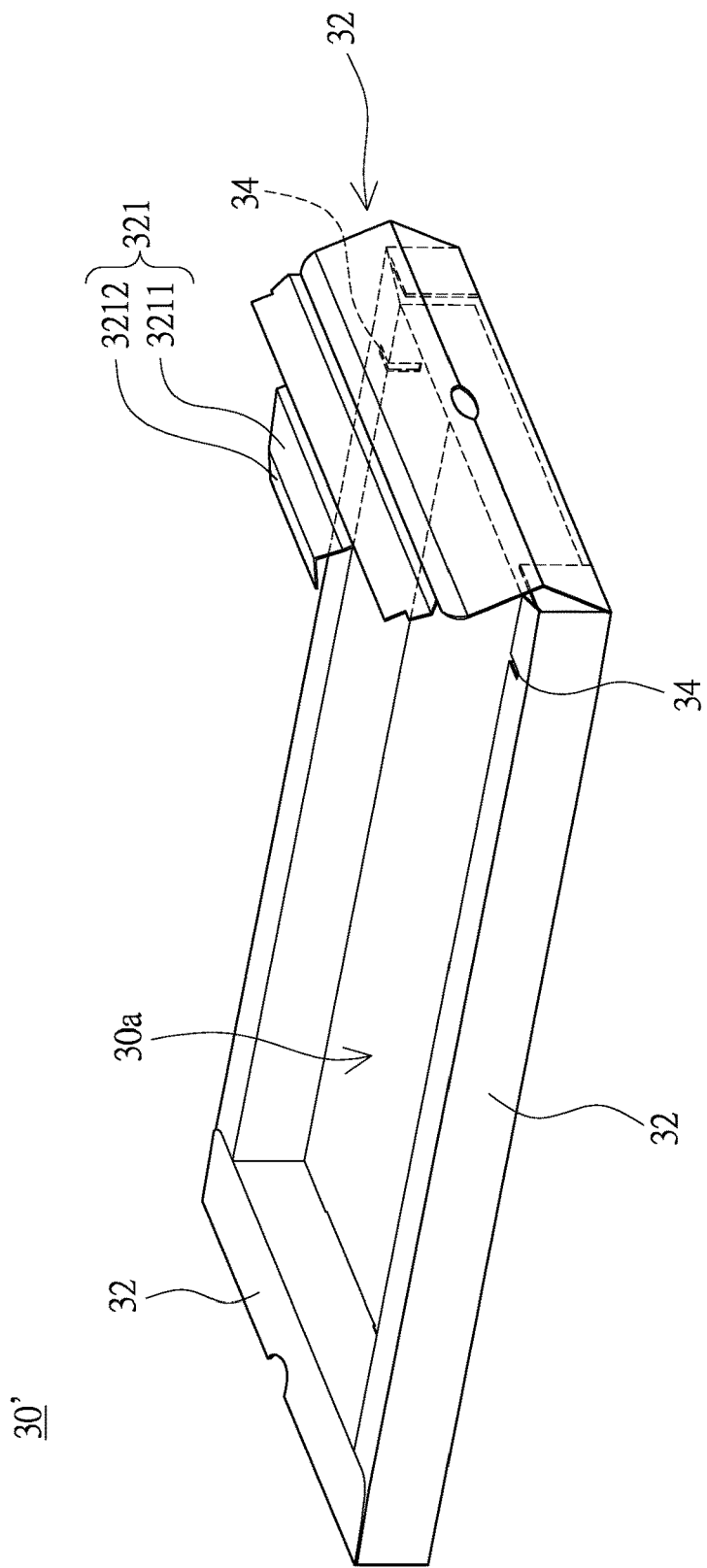
FIG. 4 is a partial exploded view showing the housing structure of the pet house according to the embodiment of the present disclosure.

Referring to FIG. 3A and FIG. 3B, in practical applications, the housing structure 10 can be formed by bending and engaging a first paperboard 10' and a second paperboard 10". In the present embodiment, the top portion 13 is exemplified by a top plate 131 and the four side plates 132, but is not limited thereto. Referring to FIG. 3B, the first paperboard 10' includes the bottom plate 11, the two surrounding side plates 12, 12', the two side plates 132, 132' of the top portion 13, and the top plate 131. The second paperboard 10" includes the two surrounding side plates 12", 12'", the two side plates 132", 132'" of the top portion 13, and the top plate 131. The first paperboard 10' is engaged with the second paperboard 10" to form the housing structure 10.

Three side edges of the surrounding side plate 12 of the first paperboard 10' are respectively and bendably connected to the bottom plate 11, the surrounding side plate 12', and one side plate 132 of the top portion 13, in which the surrounding side plate 12 is formed with the opening 121. Another side edge of the surrounding side plate 12' is bendably connected to another side plate 132' of the top portion 13. The other two side edges of the surrounding side plate 12' are bendably connected to two auxiliary plates 14, and another side edge of the side plate 132 connected to the surrounding side plate 12 is bendably connected to the top plate 131 of the top portion 13. Moreover, two side edges of the bottom plate 11, one side edge of the surrounding side plate 12, and one side edge of the top plate 131, are outwardly extended to form a plurality of first coupling structures L1. A plurality of second coupling structures L2 (i.e., perforations) are formed between the surrounding side plate 12' and the two auxiliary plates 14. One side plate 132 of the top portion 13 is formed with the two engaging structures 1321 (i.e., perforations).

Referring to FIG. 3A, two side edges of the surrounding side plate 12" of the second paperboard 10" are respectively and bendably connected to another surrounding side plate 12'" and one side plate 132" of the top portion 13, in which the surrounding side plate 12" is formed with the opening 121, and another side edge of the side plate 132" is bendably connected to the top plate 131 of the top portion 13. One side edge of the surrounding side plate 12'" is bendably connected to the side plate 132'" of the top portion 13. One side edge of the surrounding side plate 12" is outwardly extended to form the plurality of first coupling structures L1. One side edges of the two surrounding side plates 12", 12'" are outwardly extended to form the auxiliary plates 14, respectively. The plurality of second coupling structures L2 (i.e., perforations) are formed between the two surrounding side plates 12", 12'" and the auxiliary plates 14. The plurality of second coupling structures L2 (i.e., perforations) are also formed between the side plate 132" and the top plate 131.

As described above, the second coupling structures L2 of the surrounding side plates 12' of the first paperboard 10' are capable of being correspondingly engaged with the first coupling structures L1 of the surrounding side plate 12" of the second paperboard 10". The first coupling structures L1 of the bottom plate 11 of the first paperboard 10' are capable of being respectively engaged with the second coupling structures L2 of the surrounding side plate 12' of the first paperboard 10' and the second coupling structures L2 of the surrounding side plate 12", 12'" of the first paperboard 10'. The second coupling structures L2 of the surrounding side plates 12", 12'" of the second paperboard 10" are capable of being engaged with the first coupling structures L1 of the surrounding side plate 12, 12' of the first paperboard 10'. The first coupling structures L1 of the top portion 13 of the first paperboard 10' are capable of being correspondingly engaged with the second coupling structures L2 of the top portion 13 of the second paperboard 10". Accordingly, the first paperboard 10' and the second paperboard 10" are capable of being connected to each other through the first coupling structure L1 and the second coupling structure L2 to form the housing structure 10 shown in FIG. 1. It should be noted that the housing structure 10 may be assembled by the engagement of more paperboards or one paperboard, and is not limited to those shown in the Figs. In addition, the structure of the top portion 13 and its shape after assembly may be varied according to practical needs, and are not limited to those shown in the Figs.

Referring to FIGS. 1 to 3B, in one preferred embodiment, one of the surrounding side plates 12 includes a liftable door structure 122, and the liftable door structure 122 is capable of selectively communicating the accommodating space 10a with the outside of the housing structure 10. When the liftable door structure 122 is communicating the accommodating space 10a with the outside of the housing structure 10, the auxiliary carrier 30 is capable of being correspondingly disposed in the accommodating space 10a through the perforation 12a formed by the liftable door structure 122 on the surrounding side plate 12. Accordingly, a user can easily replace the auxiliary carrier 30 through the liftable door structure 122.

Referring to FIG. 1 and FIGS. 4 to 6, the auxiliary carrier 30 includes a box structure 30' and a plurality of sheet bodies 40. A side of the box structure 30' is recessed to form an accommodating recess 30a. The sheet bodies 40 are detachably and upright disposed in the accommodating recess 30a. The narrow side of each of the sheet bodies 40 is formed with a wave structure, and the wave structures of the sheet bodies 40 are correspondingly exposed to an opening of the accommodating recess 30a when the sheet bodies 40 are disposed in the accommodating recess 30a. In practical applications, the sheet bodies 40 may be corrugated cardboards, and the sheet bodies 40 may be used as cat scratch boards. In various embodiments, the user can also place other items into the accommodating recess 30a according to practical needs, and is not limited to placing the sheet bodies 40, for example, the user can also place pet diapers into the accommodating recess 30a. Accordingly, the user can easily replace the cat scratch boards or the pet diapers through the auxiliary carrier 30 and the liftable door structure 122.

Figure 5:
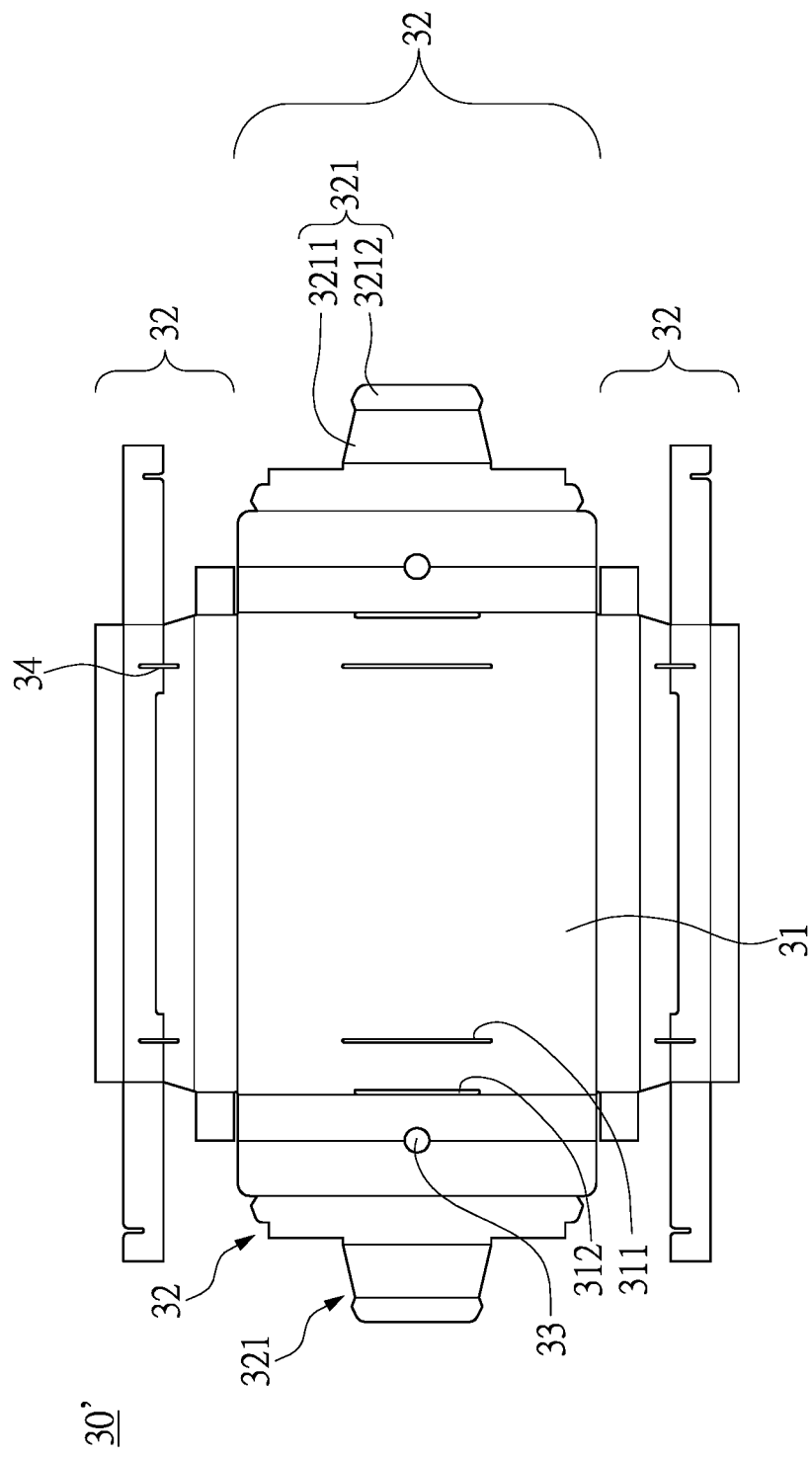
FIG. 5 is a schematic view showing the flattened state of the housing structure of the pet house according to the embodiment of the present disclosure.
Figure 6:
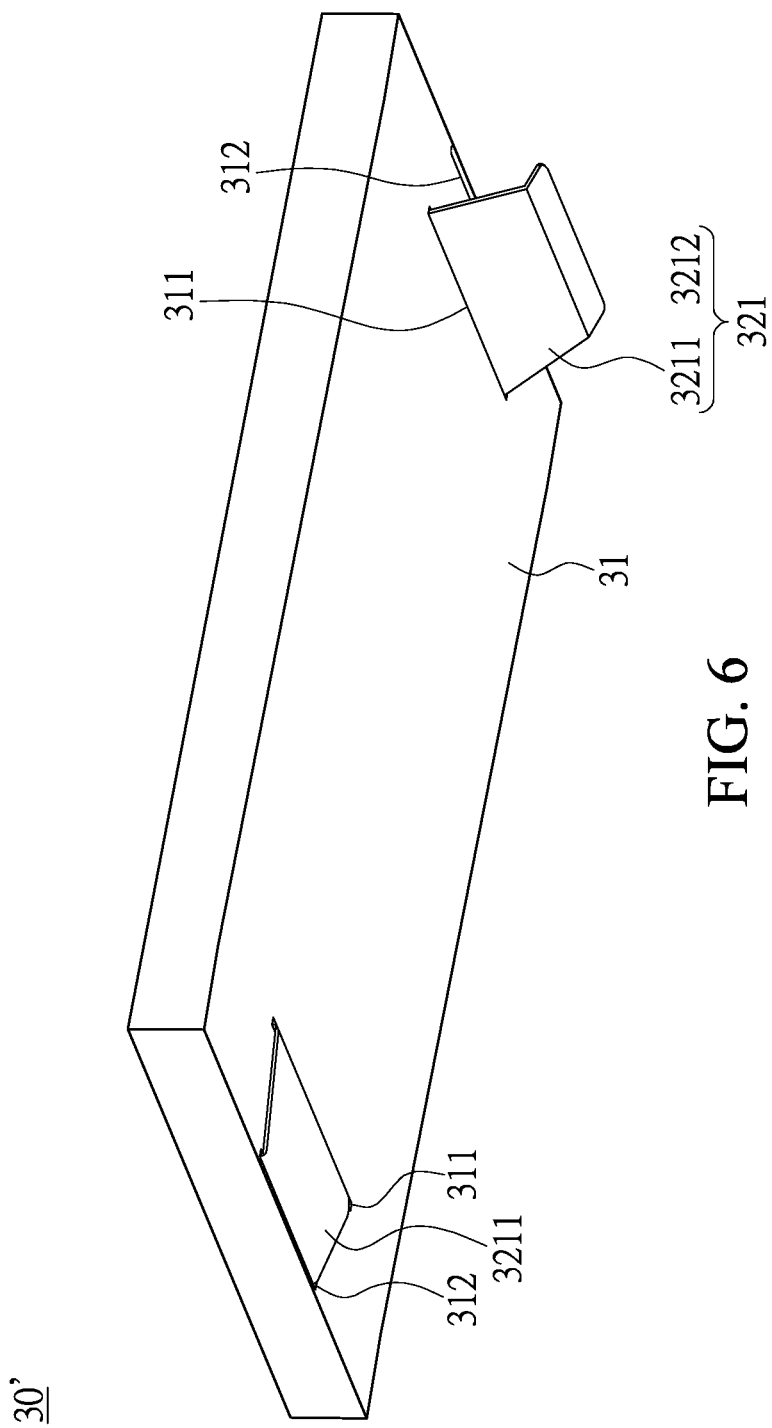
FIG. 6 is a partial exploded view showing the housing structure of the pet house from another viewing angle according to the embodiment of the present disclosure.

More specifically, as shown in FIG. 5 and FIG. 6, the box structure 30' includes a bottom wall panel 31 and four side wall panels 32, and the side wall panels 32 are bendably connected to the peripheral edges of the bottom wall panel 31. The bottom wall panel 31 is respectively formed with a first engaging perforation 311 and a second engaging perforation 312 which are adjacent to the two side wall panels 32 opposed to each other, and the first engaging perforation 311 and the second engaging perforation 312 are spaced apart from each other. Two side wall panels 32, which are opposed to each other and adjacent to the first engaging perforation 311, each are outwardly extended to form an auxiliary engaging portion 321 at a side away from the bottom wall panel 31. Each auxiliary engaging portion 321 includes a first auxiliary plate body 3211 and a second auxiliary plate body 3212, in which the widths of each first auxiliary plate body 3211 and each second auxiliary plate body 3212 are not larger than the widths of the corresponding first engaging perforation 311 and the second engaging perforation 312.

Referring to FIG. 6, when the side wall panels 32 and the bottom wall panel 31 are assembled to form the box structure 30', each auxiliary engaging portion 321 can correspondingly pass through the corresponding second engaging perforation 312 and is located on a side of the bottom wall panel 31 opposite to the accommodating recess 30a, and each second auxiliary plate body 3212 can correspondingly pass through the first engaging perforation 311. Therefore, the structural strength of the auxiliary carrier 30 can be enhanced.

In practical applications, the auxiliary carrier 30 includes at least two auxiliary pick up structure 33. Accordingly, the user can quickly and easily pick up the auxiliary carrier 30 from the accommodating space 10a by the auxiliary pick up structure 33. The auxiliary pick up structure 33 is, but not limited to, a notch, a rope, any protruding structure or any concave structure.

In addition, the two side wall panels 32 each include two auxiliary fixing perforations 34, and the two side wall panels 32 can be partially and correspondingly inserted into the two auxiliary fixing perforations 34 when the bottom wall panel 31 and the side wall panels 32 are assembled to form the box structure 30'. Accordingly, the structural strength of the auxiliary carrier 30 can also be enhanced.

Figure 7:
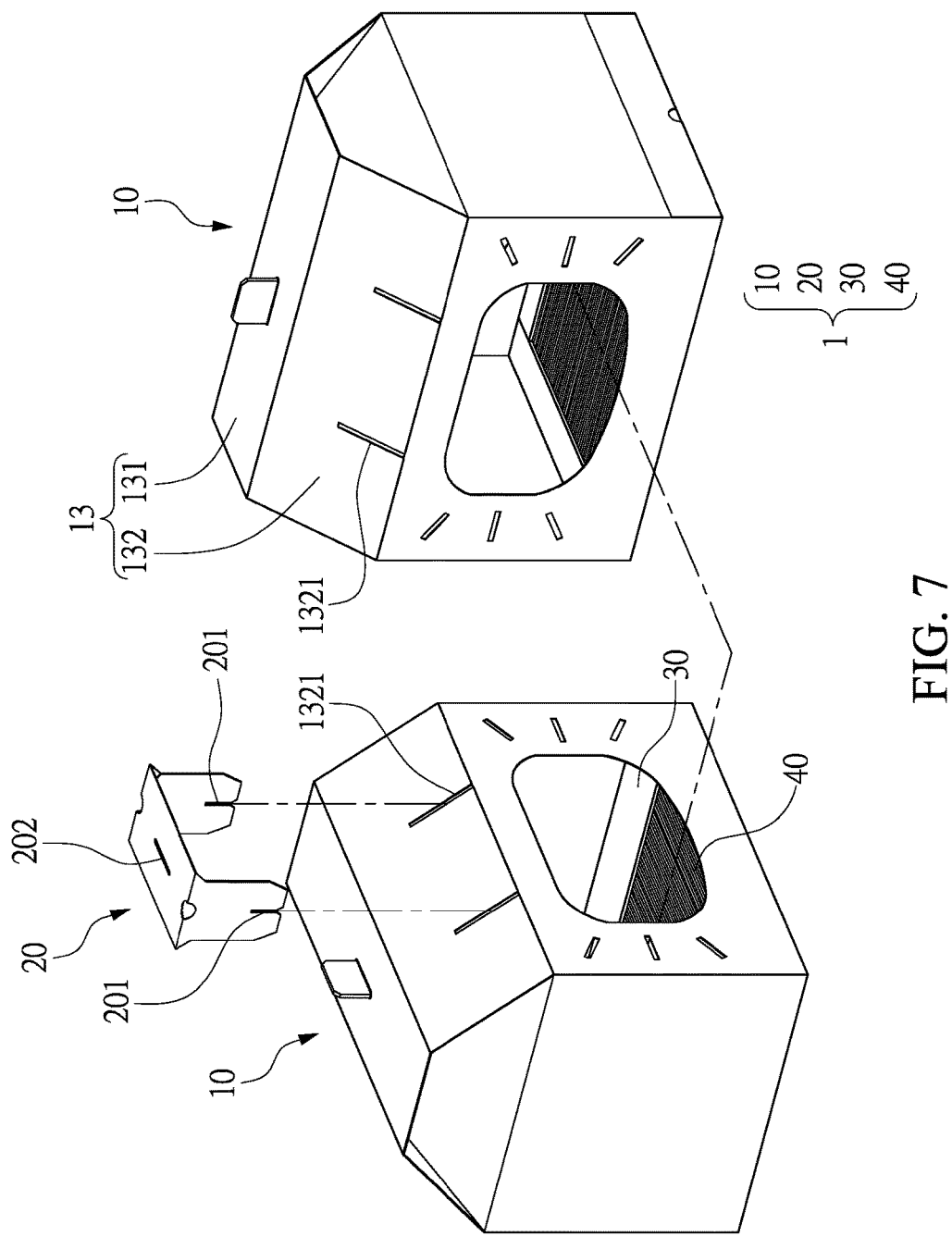
FIG. 7 is an exploded view showing two pet houses according to the embodiment of the present disclosure.
Figure 8:
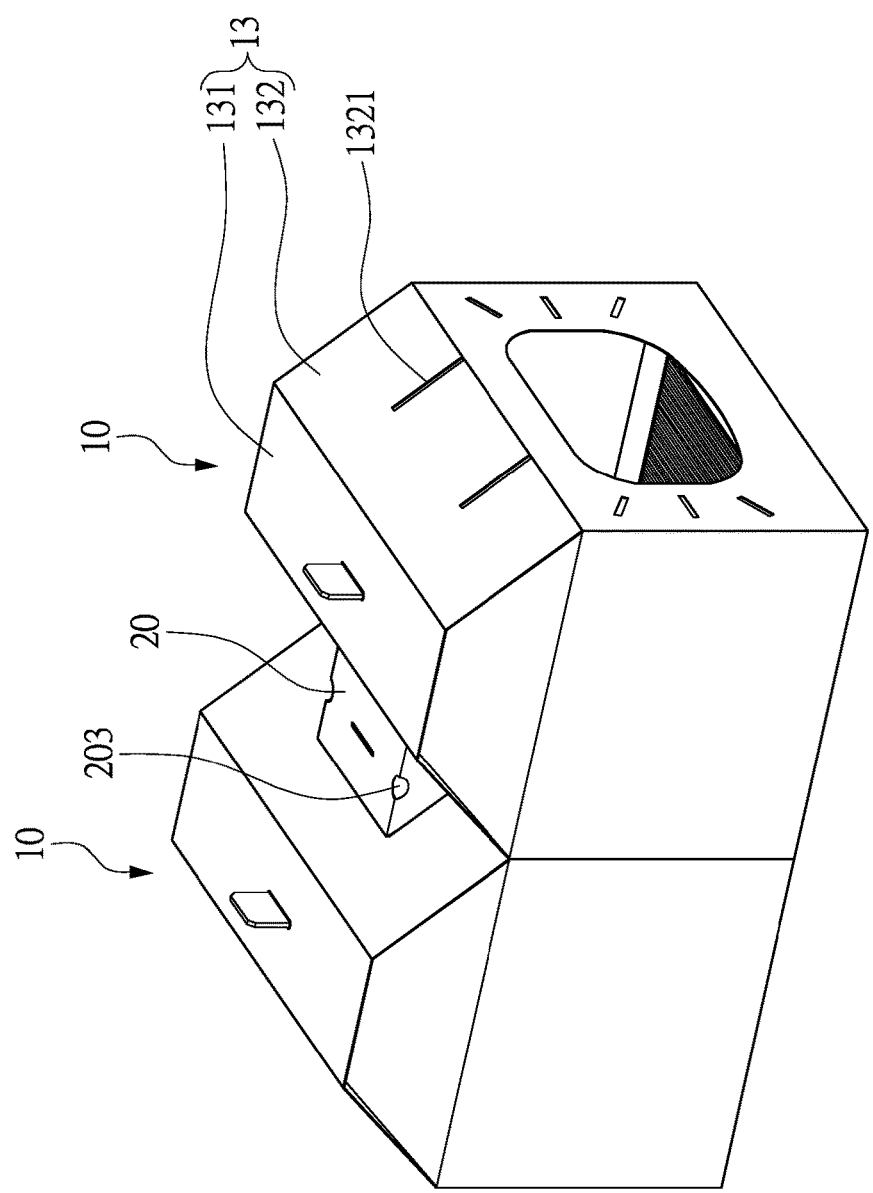
FIG. 8 and FIG. 9 are perspective views showing the two pet houses connected to each other.
Figure 9:
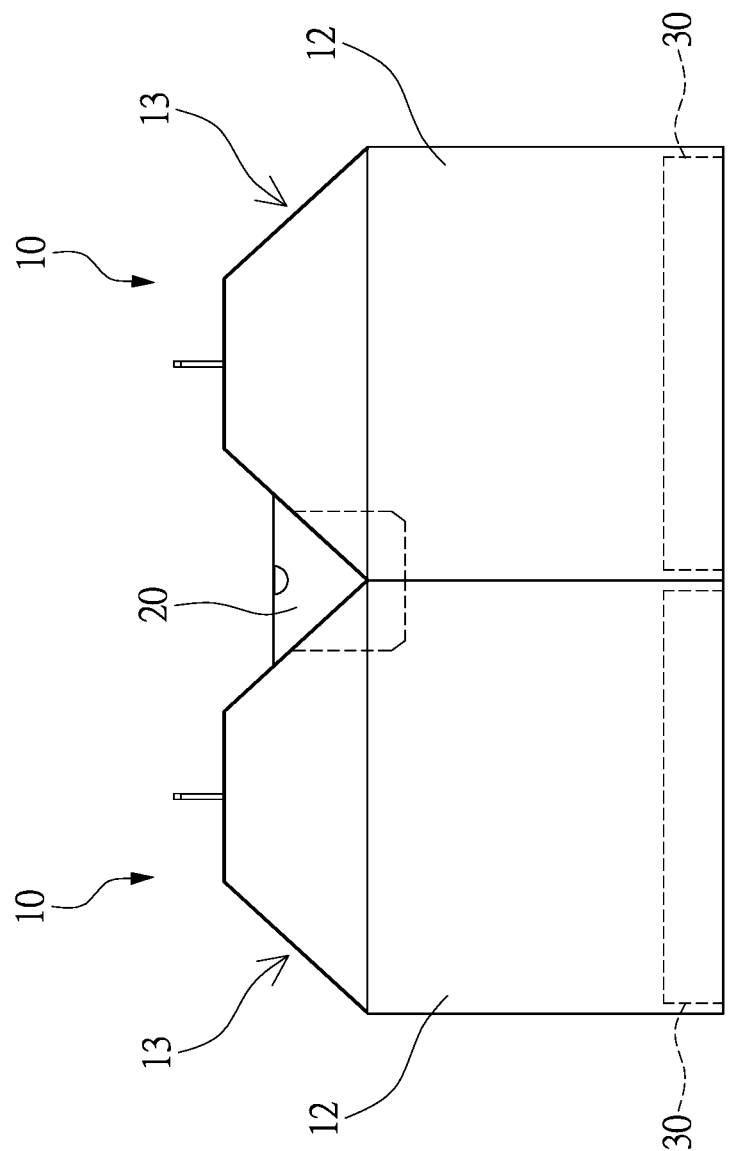
Figure 10:
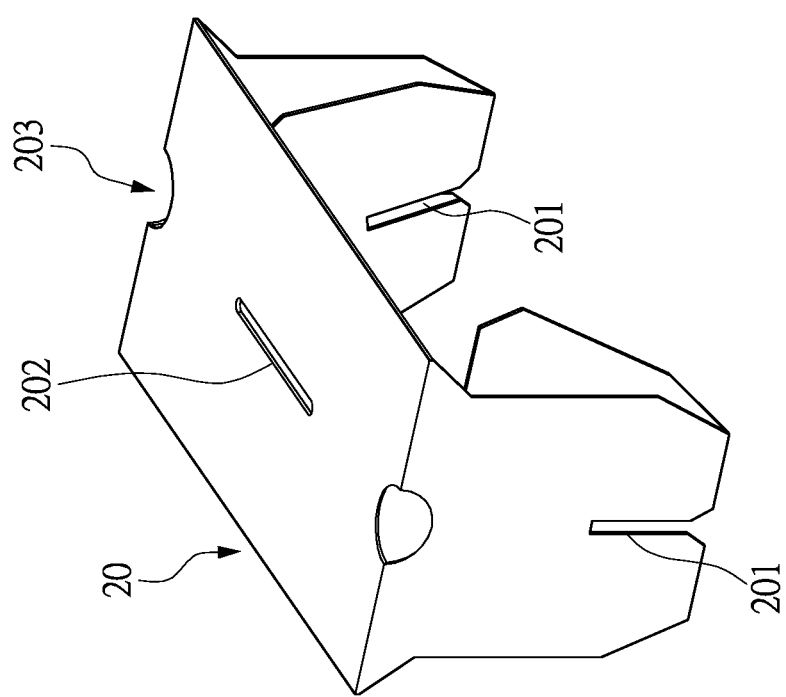
FIG. 10 is a perspective view showing an engaging member of the pet house according to the embodiment of the present disclosure.
Figure 11:
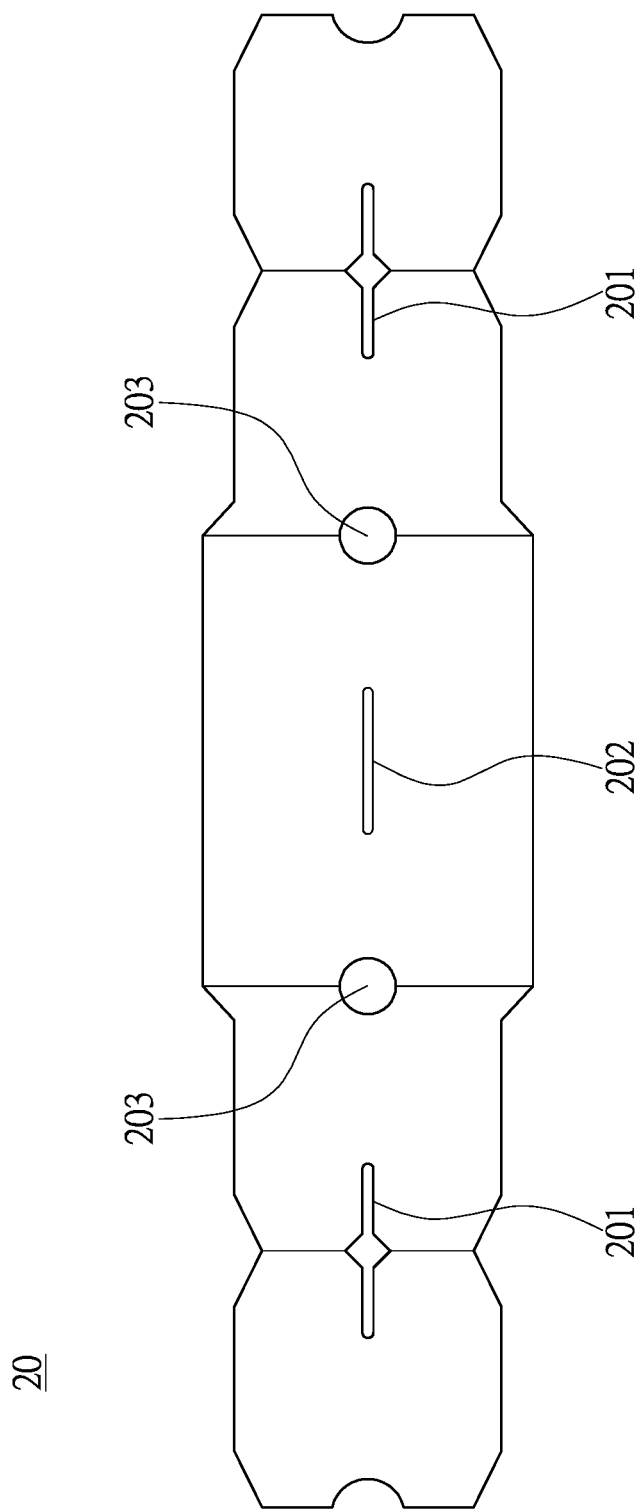
FIG. 11 is a schematic view showing the flattened state of the engaging member of the pet house according to the embodiment of the present disclosure.

Referring to FIGS. 7 to 9, the side plates 132 of each pet house 1 respectively have a plurality of the engaging structures 1321, and the engaging member 20 can be partially and correspondingly inserted into the engaging structures 1321 of two pet houses 1. Accordingly, the two pet houses 1 are capable of being adjacently connected to each other through engagement of the engaging structures 1321 and the engaging member 20. Further, as shown in FIG. 10 and FIG. 11, the figures show the perspective view and flattened state of the engaging member 20. The engaging member 20 can be formed by bending a long paperboard. The engaging member 20 can be roughly divided into three portions, the portions at two ends thereof can be bendably connected to the middle portion thereof, and the portions at two ends thereof can be respectively formed with an engaging notch 201. Two side portions of each engaging notch 201 are configured to be correspondingly inserted into the engaging structures 1321 (i.e., perforations) of the two pet houses 1, and each engaging notch 201 can hold the portions of the two pet houses 1. In various embodiments, the shape of each engaging member 20 and its structure combined with the two pet houses 1 may be varied according to practical needs, and are not limited to those shown in the Figs. In addition, the position where the engaging member 20 is engaged with the two pet houses 1 is also not limited to those shown in the Figs. In various embodiments, the engaging member 20 can also be connected to the top plates 131 of the two pet houses 1, the surrounding side plates 12, or the bottom plate 11. In addition, the engaging member 20 includes an auxiliary structure 203 (i.e., perforations), and the auxiliary structure 203 is used to assist the user to pick up the engaging member 20 fixed to the two pet houses 1. In practical applications, the auxiliary structure 203 may be any structures that can separate the engaging member 20 from the two pet houses 1, and is not limited to the perforation shown in the Figs.

Figure 12:
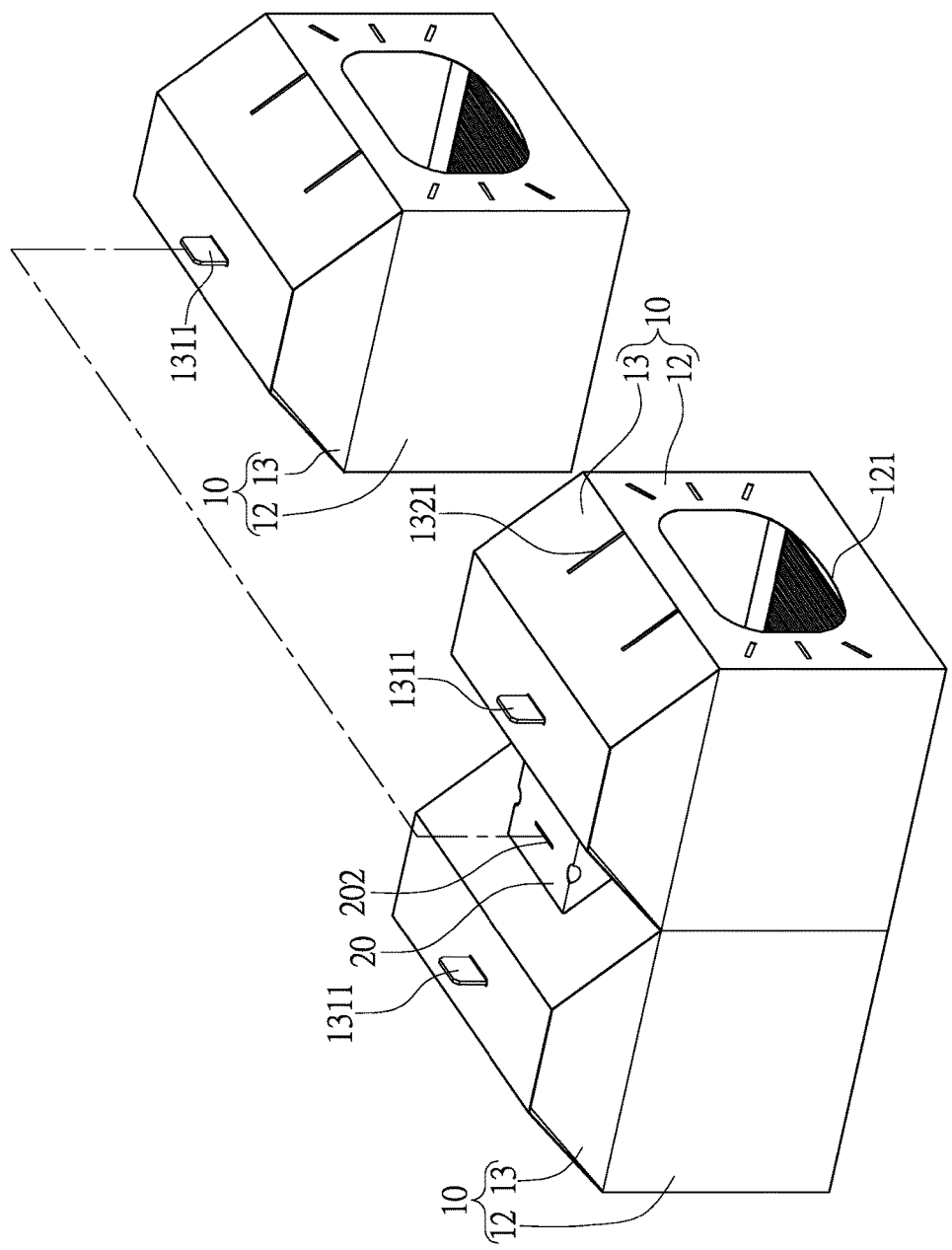
FIG. 12 is an exploded view showing three pet houses according to the embodiment of the present disclosure.
Figure 13:
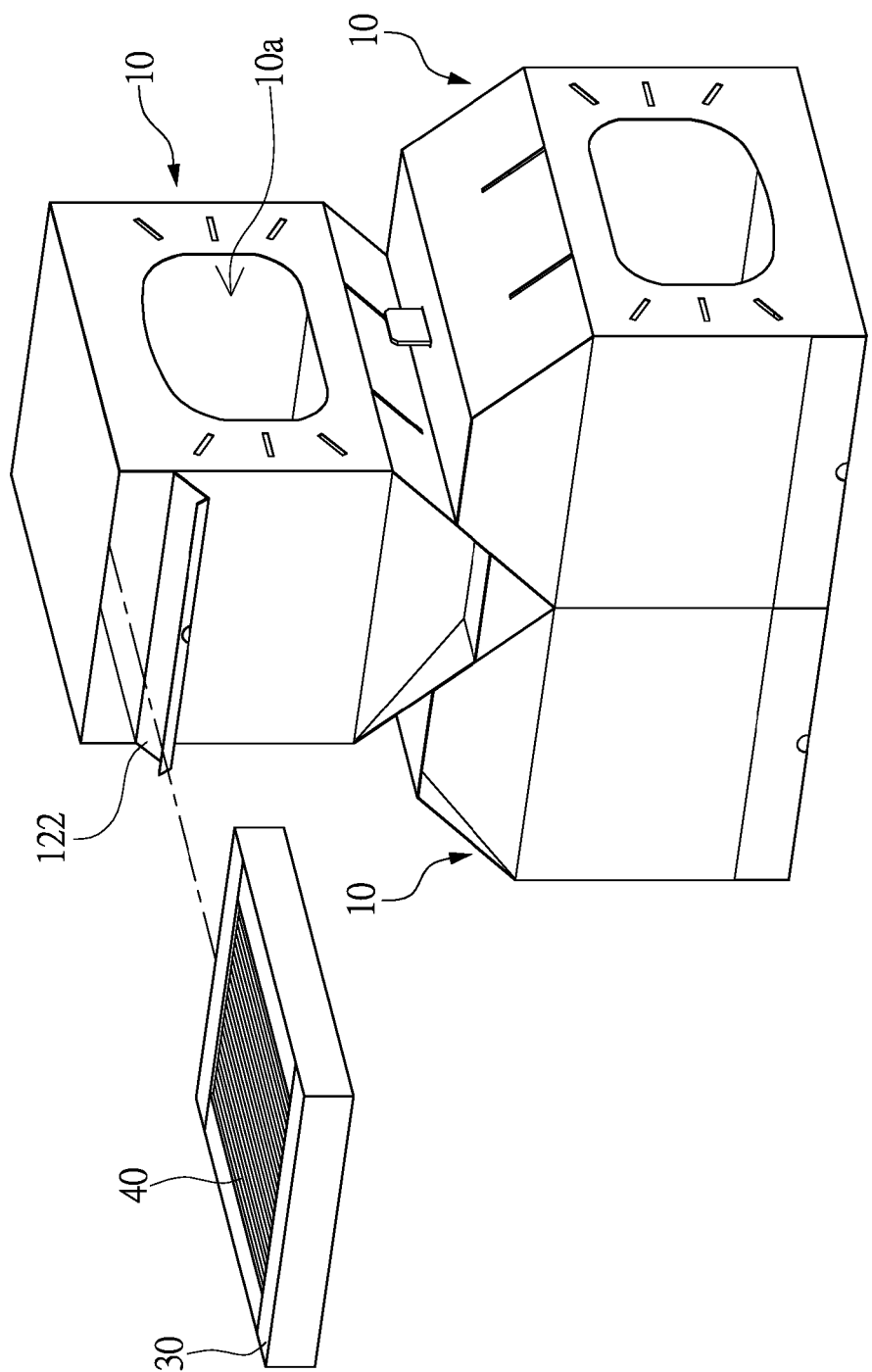
FIG. 13 and FIG. 14 are perspective views showing the three pet houses connected to each other.
Figure 14:
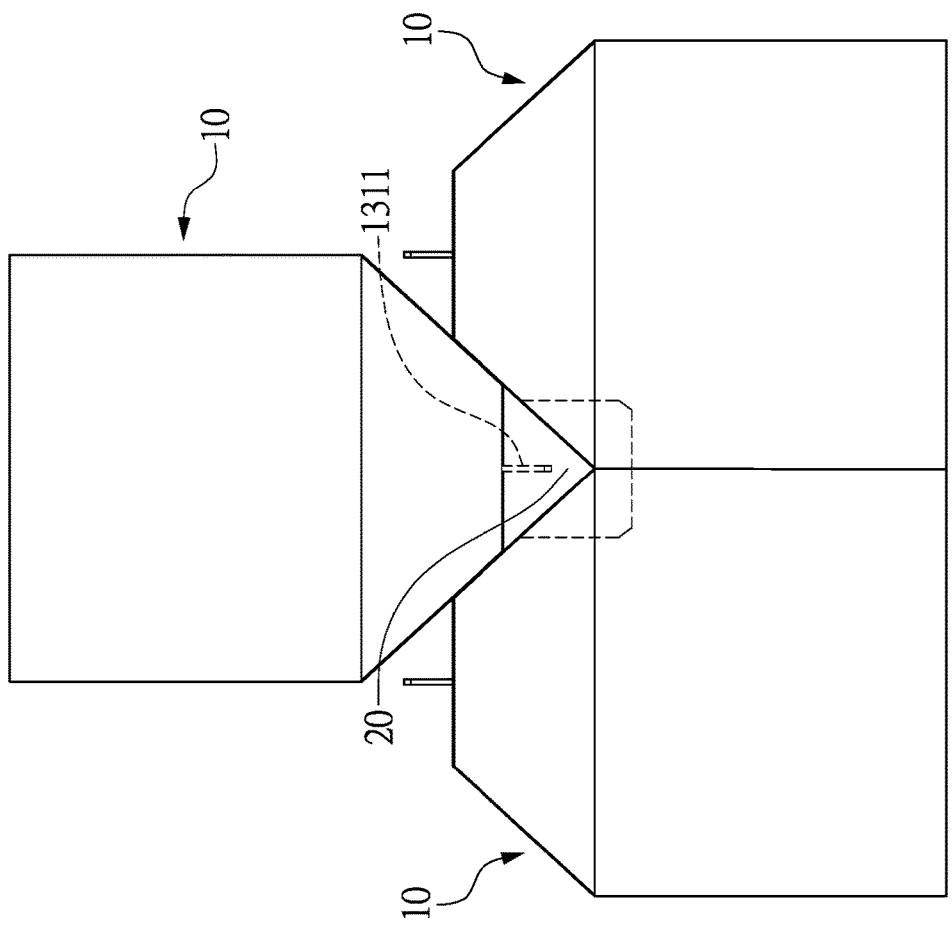

Referring to FIGS. 12 to 14, the middle portion of the engaging member 20 has a top engaging structure 202 (i.e., perforations), and the top plate 131 of the pet house 1 correspondingly has a connecting structure 1311 (i.e., protruding structure). Accordingly, the two pet houses 1, which are adjacently connected to each other through the engaging member 20, are capable of being engaged with the connecting structure 1311 of the other pet house 1 through the top engaging structure 202 of the engaging member 20 so that the other pet house 1 is capable of being reversely connected between the two pet houses 1 adjacently connected to each other. In other words, single engaging member 20 is capable of allowing three pet houses 1 to be connected to each other. The other pet house 1, which is reversely connected between the two pet houses 1, can allow the auxiliary carrier 30 to be disposed in the accommodating space 10a thereof through the liftable door structure 122.

Figure 15:
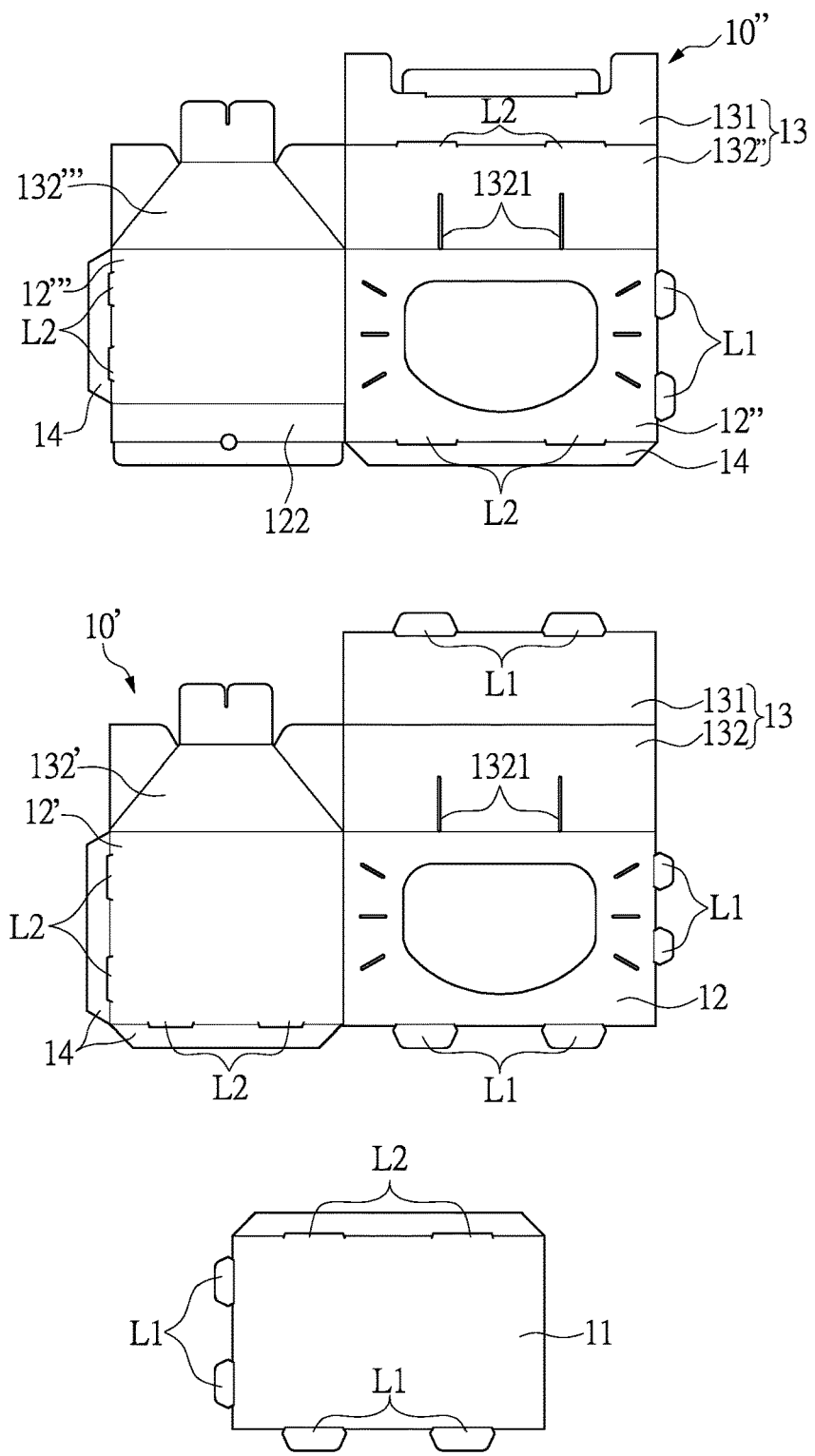
FIG. 15 and FIG. 16 are schematic views showing the flattened states of the housing structure and the engaging member of the pet house according to another embodiment of the present disclosure.
Figure 16:
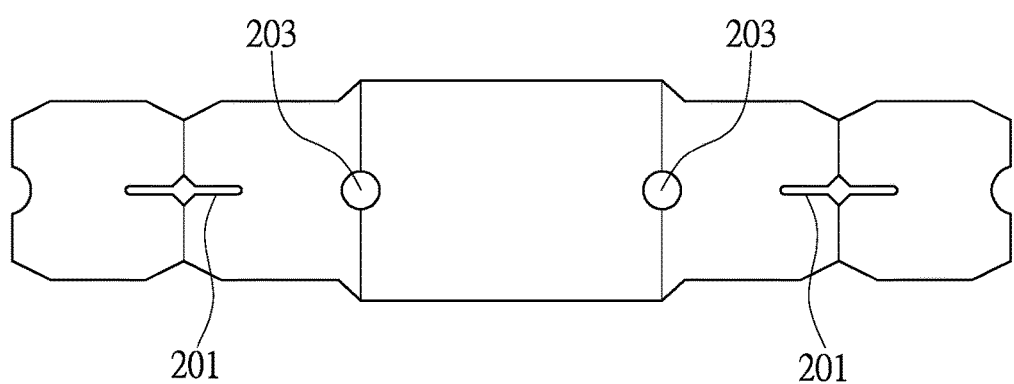

In various embodiments, the designs of the flattened states of the bottom plate 11, surrounding side plate 12, top portion 13, and the engaging member 20, may be varied according to practical needs, and are not limited to those shown in FIG. 3A, FIG. 3B, and FIG. 11. More specifically, referring to FIG. 15 and FIG. 16, the bottom plate 11 can be a separate component and is not connected to any surrounding side plate 12 in the flattened states of the housing structure 10 and the engaging member 20. In contrast, a side of the bottom plate 11 can be additionally provided with the second coupling structure L2, and a side of the surrounding side plate 12 connected to the bottom plate 11 can be additionally provided with the first coupling structure L1. In addition, referring to FIG. 15 and FIG. 16, the top plate 131 can have no any connecting structure 1311, and the engaging member 20 can have no any the top engaging structure 202.

The descriptions illustrated supra set one simply the preferred embodiment of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:
1. A pet house, comprising:
a housing structure including a bottom plate, four surrounding side plates, and a top portion, the peripheral edges of the bottom plate connected to the surrounding side plates, the top portion connected to the surrounding side plates, the inside of the housing structure formed with an accommodating space, at least one of the surrounding side plates having an opening, and the opening communicating the accommodating space with the outside of the housing structure; wherein at least two of the bottom plate, the surrounding side plates, and the top portion are detachably connected to each other, and at least one of the surrounding side plates and the top portion includes at least one engaging structure;
an engaging member detachably engaged with the engaging structure, wherein when the engaging member is engaged with the engaging structure, a portion of the engaging member is exposed to the outside of the housing structure, and the engaging member is capable of being engaged with the engaging structure of another pet house; and an auxiliary carrier disposed in the accommodating space, wherein the area of the bottom plate is not less than that of the auxiliary carrier, and the auxiliary carrier is capable of being correspondingly placed on the bottom plate when the auxiliary carrier is disposed in the accommodating space; wherein the auxiliary carrier is capable of being correspondingly disposed in the accommodating space when at least two of the bottom plate, the surrounding side plates, and the top portion are separated from each other.

2. The pet house according to claim 1, wherein the top portion includes a connecting structure, and the engaging member includes a top engaging structure; wherein the two pet houses are capable of being adjacently connected to each other through the at least one engaging member, and the other pet house is capable of being engaged with the top engaging structure of the engaging member through the connecting structure of the top portion so that the other pet house is capable of being connected to the two pet houses adjacently connected to each other.

3. The pet house according to claim 2, wherein the two ends of the engaging member are capable of being correspondingly connected to the two pet houses so that the two pet houses are adjacently connected to each other; wherein the top engaging structure is provided between the two ends of the engaging member, and the other pet house is capable of being engaged with the top engaging structure through the connecting structure so that the other pet house is capable of being reversely connected between the two pet houses adjacently connected to each other.

4. The pet house according to claim 3, wherein the auxiliary carrier is capable of being disposed in the other pet house which is reversely connected between the two pet houses adjacently connected to each other.

5. The pet house according to claim 2, wherein the top portion includes a plurality of side plates and a top plate, at least one of the side plates has the engaging structure, and the top plate has the connecting structure; wherein when the bottom plate, the surrounding side plates, and the top portion, are connected to each other to form the housing structure, the peripheral edges of the top plate are connected to the side plates, and the top plate is disposed opposite to the bottom plate.

6. The pet house according to claim 1, wherein a side edge of the bottom plate and a side edge of one of the surrounding side plates are bendably connected to each other, the adjacent side edges of the surrounding side plates are bendably connected to each other, and another side edges of the surrounding side plates and the top portion are bendably connected to each other; wherein at least one side edge of the bottom plate, the surrounding side plates, and the top portion, is extended to form at least one first coupling structure or at least one second coupling structure, and the bottom plate, the surrounding side plates, and the top portion, are connected to each other through the first coupling structure and the second coupling structure to form the housing structure.

7. The pet house according to claim 1, wherein the auxiliary carrier includes a box structure and a plurality of sheet bodies, a side of the box structure is recessed to form an accommodating recess, the sheet bodies are detachably and upright disposed in the accommodating recess, the narrow side of each of the sheet bodies is formed with a wave structure, and the wave structures of the sheet bodies are correspondingly exposed to an opening of the accommodating recess when the sheet bodies are disposed in the accommodating recess.

8. The pet house according to claim 7, wherein the box structure includes a bottom wall panel and four side wall panels, and the side wall panels are bendably connected to the peripheral edges of the bottom wall panel; the bottom wall panel is formed with a first engaging perforation and a second engaging perforation which are adjacent to at least one of the side wall panels, and the first engaging perforation is spaced apart from the second engaging perforation; at least one of the side wall panels includes an auxiliary engaging portion, and the auxiliary engaging portion includes a first auxiliary plate body and a second auxiliary plate body; wherein when the side wall panels and the bottom wall panel are assembled to form the box structure, the auxiliary engaging portion passes through the second engaging perforation and is located on a side of the bottom wall panel opposite to the accommodating recess, the first auxiliary plate body is correspondingly attached to the outside of the bottom wall panel, and the second auxiliary plate body correspondingly passes through the first engaging perforation.

9. The pet house according to claim 1, wherein one of the surrounding side plates of the pet house has a liftable door structure, the liftable door structure is capable of selectively communicating the accommodating space with the outside of the housing structure; wherein when the liftable door structure is communicating the accommodating space with the outside of the housing structure, the auxiliary carrier is capable of being correspondingly disposed in the accommodating space through the perforation formed by the liftable door structure on the surrounding side plate.

10. The pet house according to claim 9, wherein the auxiliary carrier has at least one auxiliary pick up structure, and when the auxiliary carrier is disposed in the accommodating space, the auxiliary pick up structure is disposed adjacent to the liftable door structure so that the auxiliary carrier is movable from the accommodating space by the auxiliary pick up structure.

* * * * *